Figure 1:
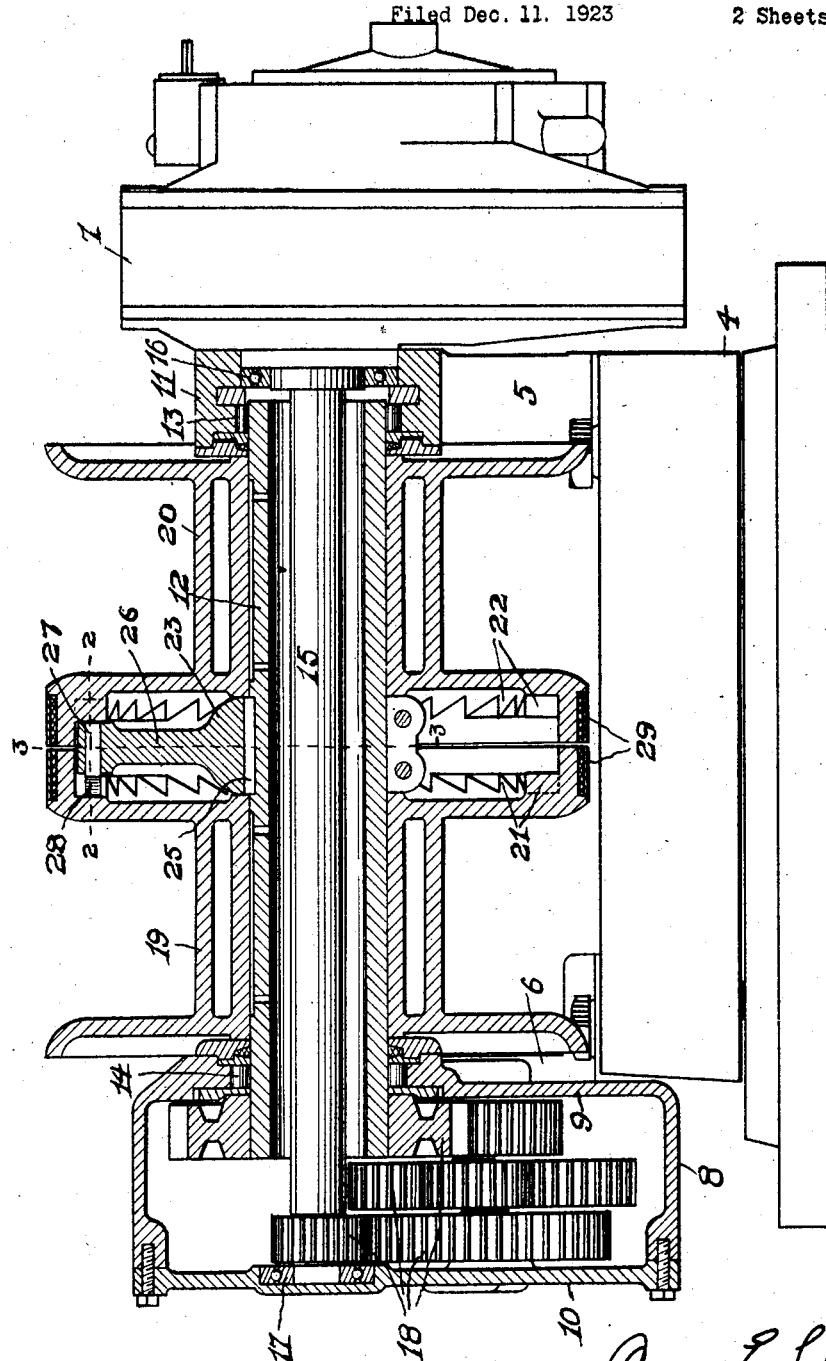

June 21, 1927.

O. E. CLARK

HOIST

Filed Dec. 11, 1923

1,633,543

2 Sheets-Sheet 1

Inventor
Omar E. Clark
By
Attorney

June 21, 1927.
O. E. CLARK
1,633,543
HOIST
Filed Dec. 11, 1923
2 Sheets-Sheet 2
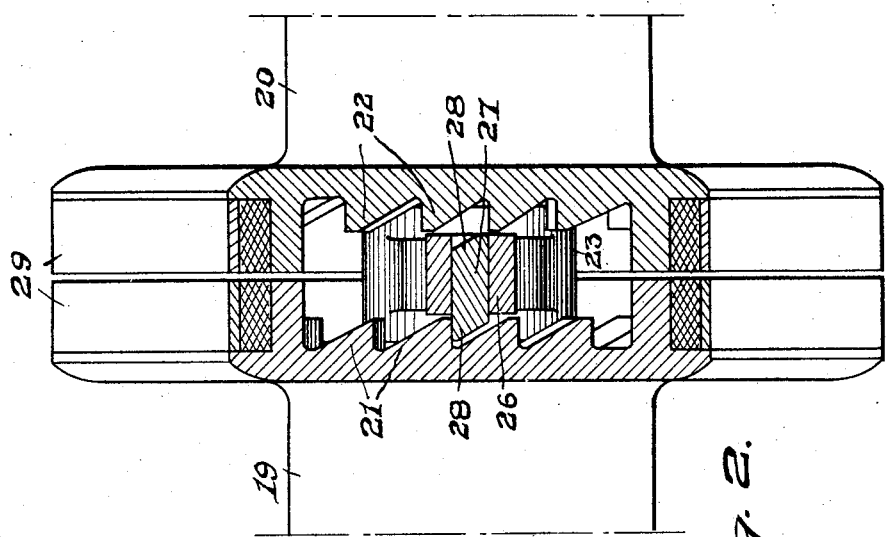
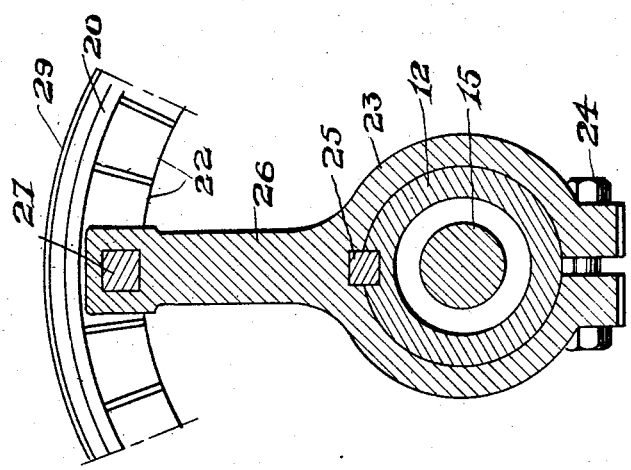
Inventor
Omar E. Clark
By
Attorney Patented June 21, 1927.

UNITED STATES PATENT OFFICE.

OMAR E. CLARK, OF DENVER, COLORADO.

HOIST.

Application filed December 11, 1923. Serial No. 680,006.

The present invention relates to double drum hoists, and the object is to provide a simple structure, involving a reversible motor, a pair of winding drums, and means of a novel character for supporting the drums and coupling one to the motor when said motor is operated in one direction, while the other is released, and coupling the other to the motor when said motor is operated in an opposite direction, at the same time releasing the first drum.

In the accompanying drawings:

Figure 1 is a view partially in elevation and partially in longitudinal section, showing the novel construction, Figure 2 is a detail sectional view on an enlarged scale and on the line 2—2 of Figure 1, Figure 3 is a detail vertical sectional view on the line 3—3 of Figure 1.

In the embodiment disclosed, a suitable base 4 is employed, having spaced supports 5 and 6. The support 5 carries a suitable reversible motor 7, which may be of any well-known or desired character. The support 6 is provided with a gear housing 8 having an inner side wall 9 and an outer removable cover plate 10, constituting an outer wall.

The support 5 includes a journal box 11, and extending from said journal box to the gear housing, is a tubular shaft 12, one end having a roller bearing 13 in the box 11, the other end having a roller bearing 14 in the inner wall 9 of the gear housing. The shaft projects beyond the bearing 14 and into said housing. A motor shaft 15 extends from the motor 7, through the tubular shaft 12 in spaced relation thereto, and is provided with a ball bearing 16 in the box 11, its opposite end extending across the gear housing, and having a ball bearing 17 in the outer wall or cover plate 10. Gearing 18 within the housing, connects the ends of the shafts 15 and 12 that are in said housing. As a consequence it will be evident that when the motor 7 is driven in one direction the tubular shaft 12 will be rotated in one direction and when the motor 7 is driven in the opposite direction the shaft 12 will also be rotated in the opposite direction.

Loosely journaled directly on the tubular shaft 12 between the journal box 11 and inner wall 9 of the gear housing and arranged end to end on said shaft 12, are separate winding drums 19 and 20, these drums having on their adjacent ends or heads, rings of clutch teeth 21 and 22, the teeth of one ring being arranged oppositely to those of the other in a manner well understood. A driving member is rigidly fixed to the shaft 12 between the heads. This driving member may consist of a contractile split clamping ring, 23, the ends of which are connected by tie bolts 24, and said ring may be keyed, as illustrated at 25, to the shaft 12. The ring carries an outstanding radial portion 26 in the form of a head, and in the outer end of said head is mounted a transversely reciprocating dog 27 having its ends 28 oppositely beveled, each end being adapted to interlock with the sharp shoulders of the teeth 21 and 22 respectively and the beveled sides being inclined so as to ride outwardly on the inclined shoulders. The usual brake bands 29 may be provided for retarding or holding the drums.

With the construction disclosed, it will be clear that when the motor 7 is running in one direction and the shaft 12, as above stated, is being thereby rotated in one direction, one end of the dog 27 will be engaged with one of the clutch teeth of one of the drums, as illustrated in Figures 1 and 2 while said dog will be disengaged from the teeth of the other drum. Therefore one drum will be positively rotated while the other will be free. If now the direction of rotation of the motor 7 is reversed the inclined side of the end of the dog engaged with the tooth will be brought into contact with an inclined face of the adjacent tooth. As a consequence the dog will be shifted longitudinally of itself and transversely of the driving member so that the right angular face of the other end of said dog will be brought into abutment with the sharp face of one of the teeth of the other drum. As a consequence the first drum will be released and the second drum will be automatically coupled to the motor and rotated in the opposite direction. This alternate clutching action between the motor and the two drums will take place on the reversed operations of the motor.

From the foregoing, it is thought that the construction, operation and many advantages of the herein described invention will be apparent to those skilled in the art, without further description, and it will be understood that various changes in the size, shape, proportion and minor details of construction may be resorted to without departing from the spirit or sacrificing any of the advantages of the invention.

What I claim, is:—

1. In combination, a reversibly rotatable shaft, and means for rotating it in reverse directions, a radially disposed driving head rigidly fixed to the shaft, winding drums loosely journaled on the shaft on opposite sides of the head, and a reciprocable dog having a movable engagement with the outer portion of the head remote from the shaft for alternate engagement with the drums to rotate them in opposite directions on the reverse rotation of the shaft.

2. In combination with a base, a motor and a gear housing in spaced relation thereon, a tubular shaft rotatably supported between the motor and gear housing, a reversible motor shaft within the tubular shaft, gearing in the gear housing connecting the shafts, independent drums loosely journaled with respect to the tubular shaft and supported thereby, and means for automatically connecting one of the drums to the tubular shaft when it is rotated in one direction and automatically connecting the other drum to the tubular shaft when it is rotated in the opposite direction.

3. In combination with a base, a motor and a gear housing in spaced relation thereon, a tubular shaft journaled at one end at the inner side of the motor and at the other end at the inner side of the gear housing, a motor shaft extending from the motor through the tubular shaft and having its projecting end journaled in the gear housing, gearing in the gear housing, connecting the ends of the shafts in the gear housing, independent drums journaled end to end on the tubular shaft, and a clutch member mounted on the tubular shaft between the drums and alternately movable into engagement with the drums.

4. In combination with a base, a reversible motor mounted thereon, a gear housing mounted on the base in spaced relation to the motor and having an inner and an outer wall, a tubular shaft journaled at the inner side of the motor, and in the inner wall of the gear housing, said shaft projecting into the gear housing, a motor shaft extending through the tubular shaft and journaled in the outer wall of the gear housing, gearing in the housing connecting the portions of the shafts therein, drums loosely journaled on the tubular shaft between the motor and gear housing and supported by the tubular shaft, and means for clutching the drums to the tubular shaft.

5. In combination with a base, a reversible motor mounted thereon, a gear housing mounted on the base in spaced relation to the motor and having an inner and an outer wall, a tubular shaft journaled at the inner side of the motor, and in the inner wall of the gear housing, said shaft projecting into the gear housing, a motor shaft extending through the tubular shaft and journaled in the outer wall of the gear housing, gearing in the housing connecting the portions of the shafts therein, drums located end to end and loosely journaled on the tubular shaft between the motor and gear housing and supported by the tubular shaft, and automatic means carried by the tubular shaft and located between the drums for connecting one drum to the shaft when the latter is rotated in one direction and for connecting the other drum to the shaft when said shaft is rotated in the opposite direction.

6. The combination with a support, of a reversible motor thereon, a gear housing on the support spaced from the motor, a motor shaft rotatably driven in opposite directions by the reversible motor and extending across the space between the motor and gear housing and projecting into the latter, a tubular shaft surrounding the motor shaft and projecting into the gear housing, gearing in the housing for rotating the tubular shaft from the motor shaft, a plurality of separate rotatable winding members loosely mounted side by side on the tubular shaft, and means for clutching either member to the shaft.

7. The combination with a support, of a reversible motor thereon, a gear housing on the support spaced from the motor, a motor shaft rotatably driven in opposite directions by the reversible motor and extending across the space between the motor and gear housing and projecting into the latter, a tubular shaft surrounding the motor shaft and projecting into the gear housing, gearing in the housing for rotating the tubular shaft from the motor shaft, a plurality of rotatable winding members mounted side by side on the tubular shaft, and means for connecting either of the members to and disconnecting it from the shaft.

8. The combination with a support, of a reversible motor thereon, a gear housing on the support spaced from the motor, a motor shaft rotatably driven in opposite directions by the reversible motor and extending across the space between the motor and gear housing and projecting into the latter, a tubular shaft surrounding the motor shaft and projecting into the gear housing, gearing in the housing for rotating the tubular shaft from the motor shaft, a plurality of rotatable winding members mounted side by side on the tubular shaft, and clutch means for connecting either member to the tubular shaft.

9. The combination with a support, of a reversible motor thereon, a gear housing on the support spaced from the motor, a motor shaft rotatably driven in opposite directions by the reversible motor and extending across the space between the motor and gear housing and projecting into the latter, a tubular shaft surrounding the motor shaft and projecting into the gearing housing, gearing in the housing for rotating the tubular shaft from the motor shaft, a plurality of rotatable winding members mounted side by side on the tubular shaft, and clutch means for connecting either member to the tubular shaft and simultaneously disconnecting the other therefrom.

10. The combination with a support, of a reversible motor thereon, a gear housing on the support spaced from the motor, a motor shaft rotatably driven in opposite directions by the reversible motor and extending across the space between the motor and gear housing and projecting into the latter, a tubular shaft surrounding the motor shaft and projecting into the gear housing, gearing in the housing for rotating the tubular shaft from the motor shaft, means for effecting the movements of a load-carrying device toward and from the apparatus including a plurality of separately rotatable members rotatably mounted side by side on the tubular shaft, and means for connecting either device to and disconnecting it from the tubular shaft.

11. The combination with a support, of a reversible motor thereon, a gear housing on the support spaced from the motor, a motor shaft rotatably driven in opposite directions by the reversible motor and extending across the space between the motor and gear housing and projecting into the latter, a tubular shaft surrounding the motor shaft and projecting into the gear housing, gearing in the housing for rotating the tubular shaft from the motor shaft, a pair of winding drums loosely journaled end to end on the tubular shaft and having clutch elements on their adjacent ends, and a dog member between the drums rotated by the tubular shaft and movable alternately into engagement with the clutch elements of the drum ends, said clutch elements and dog member having coacting means to cause the automatic shifting of the dog member from one clutch element to the other and its driving engagement with the latter accordingly as the rotation of the shaft is reversed.

12. The combination with a support, of a reversible motor thereon, a gear housing on the support spaced from the motor, a motor shaft rotatably driven in opposite directions by the reversible motor and extending across the space between the motor and gear housing, a tubular shaft surrounding the motor shaft, gearing in the housing for rotating the tubular shaft from the motor shaft, a plurality of rotatable members supported by the tubular shaft between the motor and gear housing and located side by side, and means for connecting each of the members to the shaft, leaving the other free to rotate on said shaft.

13. The combination with a shaft and means for rotating it continuously in one direction or the other, of drums loosely journaled directly on the shaft and located end to end, the adjacent opposing ends of said drums having oppositely disposed clutch teeth, a driving member fixed to the shaft and interposed between the drums, and a pawl mounted on the driving member at one side of the shaft to turn with the shaft and automatically reciprocated by the teeth of the drums from one drum to the other when the direction of rotation of the shaft is reversed to clutch one or the other of said drums to the shaft.

14. The combination with a shaft, of drums loosely journaled directly on the shaft and located end to end, the adjacent opposing ends of said drums having oppositely disposed clutch teeth, a pawl mounted to turn with the shaft and automatically reciprocated by the teeth of the drums from one drum to the other when the direction of rotation of the shaft is reversed to clutch one or the other of said drums to the shaft, a motor that is operable continuously in opposite directions, and a shaft driven by the motor, extending through the first shaft and geared to the first shaft to rotate it continuously in one direction or the other.

15. The combination with a shaft, of drums journaled directly on the shaft end to end and having oppositely set teeth on their opposing adjacent ends, a head on the shaft between the drums, a dog movably mounted on the head wholly at one side of the shaft so as to turn with said shaft and having oppositely disposed terminal teeth portions that respectively engage the teeth of the drums and to automatically clutch one drum or the other to the shaft accordingly as said shaft rotates in one direction or the other and said dog being automatically shifted by the teeth upon the reversal of rotation of the shaft, a reversible motor, a shaft driven by the motor and extending through the first shaft, and gearing connecting the first and second shafts.

16. In combination, a rotatable shaft, a radially disposed driving head rigidly fixed to the shaft, winding drums loosely mounted upon the shaft, one upon either side of the driving head, and a reciprocable dog mounted in the free end of the driving head remote from the shaft for alternate engagement with the drums to rotate them in opposite directions.

In testimony whereof, I affix my signature.

OMAR E. CLARK.